(12) United States Patent
Dai

(10) Patent No.: US 12,335,223 B2
(45) Date of Patent: Jun. 17, 2025

(54) INFORMATION SENDING METHOD AND APPARATUS AND ELECTRONIC DEVICE

(71) Applicant: VIVO MOBILE COMMUNICATION CO., LTD., Guangdong (CN)

(72) Inventor: Miaomiao Dai, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 19 days.

(21) Appl. No.: 18/059,043

(22) Filed: Nov. 28, 2022

(65) Prior Publication Data

US 2023/0088677 A1    Mar. 23, 2023

Related U.S. Application Data

(63) Continuation of application No. PCT/CN2021/102550, filed on Jun. 25, 2021.

(30) Foreign Application Priority Data

Jun. 29, 2020   (CN) .......................... 202010610651.8

(51) Int. Cl.
G06F 3/0482    (2013.01)
G06F 3/0484    (2022.01)
H04L 51/214    (2022.01)
H04L 51/52     (2022.01)
H04L 51/56     (2022.01)

(52) U.S. Cl.
CPC ............ *H04L 51/56* (2022.05); *H04L 51/214* (2022.05); *H04L 51/52* (2022.05)

(58) Field of Classification Search
None
See application file for complete search history.

(56) References Cited

U.S. PATENT DOCUMENTS

| 2010/0035658 A1* | 2/2010 | Lee ........................ G06F 1/1684 455/566 |
| 2011/0282951 A1* | 11/2011 | Akhtar ................... G16H 80/00 709/206 |
| 2013/0073636 A1* | 3/2013 | Zhu ...................... H04L 12/1818 709/206 |

(Continued)

FOREIGN PATENT DOCUMENTS

| CN | 106445271 A | 2/2017 |
| CN | 109194818 A | 1/2019 |

(Continued)

OTHER PUBLICATIONS

First Office Action regarding Chinese Patent Application No. 202010610651.8, dated Jul. 5, 2021. Translation provided by Bohui Intellectual Property.

(Continued)

*Primary Examiner* — Nicholas R Taylor
*Assistant Examiner* — Ho T Shui
(74) *Attorney, Agent, or Firm* — Harness, Dickey & Pierce, P.L.C.

(57) ABSTRACT

An information sending method includes: receiving, in a case that a target control is displayed, a first input performed by a user on target information in a target interface; and sending the target information to a target contact in response to the first input, where the target contact includes at least two contacts associated with the target control.

10 Claims, 4 Drawing Sheets

An information sending apparatus receives, in a case that a target control is displayed, a first input performed by a user on target information in a target interface — S101

The information sending apparatus sends the target information to a target contact in response to the first input — S102

(56) References Cited

U.S. PATENT DOCUMENTS

2014/0237335 A1* 8/2014 Liang .................. H04L 65/403
　　　　　　　　　　　　　　　　　　　　　715/753
2015/0264120 A1　9/2015　Fujiki
2018/0181288 A1　6/2018　Yu et al.

FOREIGN PATENT DOCUMENTS

| CN | 110752980 A | 2/2020 |
| CN | 110913067 A | 3/2020 |
| CN | 111061574 A | 4/2020 |
| CN | 111913629 A | 11/2020 |
| EP | 2151980 A1 | 2/2010 |
| JP | 2012-221278 A | 11/2012 |

OTHER PUBLICATIONS

International Search Report and Written Opinion of the International Searching Authority regarding International Patent Application No. PCT/CN2021/102550, dated Sep. 26, 2021. Translation provided by Bohui Intellectual Property.
Extended European Search Report regarding European Patent Application No. 21834350.7, dated Oct. 17, 2023.
First Office Action regarding Indian Patent Application No. 202317002819, dated Nov. 7, 2023.
First Office Action for Japanese Patent Application No. 2022-573482 dated Jan. 23, 2024.

* cited by examiner

INFORMATION SENDING METHOD AND APPARATUS AND ELECTRONIC DEVICE

CROSS-REFERENCE TO RELATED APPLICATIONS

This application is a Bypass Continuation Application of PCT/CN2021/102550 filed on Jun. 25, 2021, which claims priority to Chinese Patent Application No. 202010610651.8 filed on Jun. 29, 2020, which are incorporated herein by reference in their entirety.

TECHNICAL FIELD

This disclosure belongs to the field of communication technologies, and specifically relates to an information sending method and apparatus and an electronic device.

BACKGROUND

As the pace of life gradually accelerates, people's social activities become more frequent. Because a user often installs multiple social application programs on an electronic device and multiple contacts are added in each social application program, the user may perform message transmission with different contacts through multiple social application programs.

SUMMARY

Embodiments of this disclosure provide an information sending method and apparatus and an electronic device.

According to a first aspect, the embodiments of this disclosure provide an information sending method, including: receiving, in a case that a target control is displayed, a first input performed by a user on target information in a target interface; and sending the target information to a target contact in response to the first input, where the target contact includes at least two contacts associated with the target control.

According to a second aspect, the embodiments of this disclosure provide an information sending apparatus, including: a receiving module and a sending module. The receiving module is configured to receive, in a case that a target control is displayed, a first input performed by a user on target information in a target interface. The sending module is configured to send the target information to a target contact in response to the first input received by the receiving module, where the target contact includes at least two contacts associated with the target control.

According to a third aspect, the embodiments of this disclosure provide an electronic device, including a processor, a memory, and programs or instructions stored in the memory and executable on the processor, where when the programs or the instructions are executed by the processor, the steps of the method according to the first aspect are implemented.

According to a fourth aspect, the embodiments of this disclosure provide a non-transitory readable storage medium storing programs or instructions, where when the programs or the instructions are executed by the processor, the steps of the method according to the first aspect are implemented.

According to a fifth aspect, the embodiments of this disclosure provide a chip, including a processor and a communication interface, where the communication interface is coupled with the processor, and the processor is configured to execute programs or instructions to implement the method according to the first aspect.

DETAILED DESCRIPTION

Figure 1:
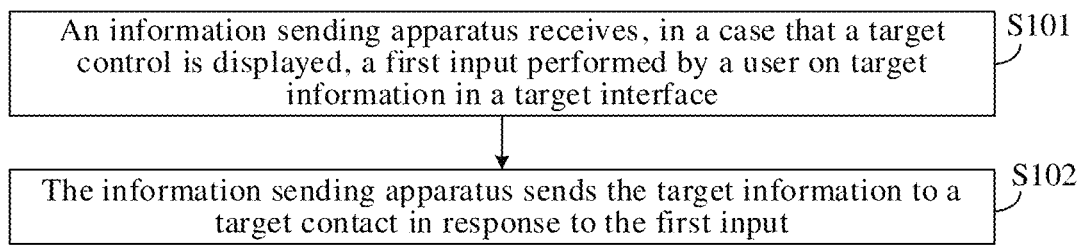
FIG. 1 is a first schematic diagram of an information sending method according to an embodiment of this disclosure.

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure shall fall within the protection scope of this disclosure.

The specification and claims of this disclosure, and terms "first" and "second" are used to distinguish similar inputs, but are not used to describe a specific sequence or order. It is to be understood that the data termed in such a way is interchangeable in proper circumstances, so that the embodiments of this disclosure can be implemented in other sequences than the sequence illustrated or described herein. In addition, "and/or" in the specification and claims represents at least one of connected objects. The character "/" generally indicates an "or" relationship between the associated objects.

In the embodiments of this disclosure, the terms, such as "exemplarily" and "for example", are used to represent giving an example, an illustration or a description. Any embodiment or design scheme described as an "exemplarily" or "for example" in the embodiments of this disclosure should not be explained as having more advantages than another embodiment or design scheme. Exactly, use of the term, such as "exemplarily" or "for example", is intended to present a related concept in a specific manner.

In the description of the embodiments of this disclosure, unless otherwise stated, "a plurality of" means two or more. For example, a plurality of controls mean two or more controls.

At present, the function of triggering the electronic device by the user to send a message still has disadvantages. For example, if a customer service staff wants to send a same message to different customers of different application programs, the customer service staff may first open a social application program and then edit and send a message after finding a customer. Then, the customer service staff may copy the message, open another social application program, and paste the message in an edit box and click to send the message after finding another customer.

In a process of implementing this application, the inventor finds that the prior art has at least the following problems: the above steps are repeated for different customers of different application programs until the message is sent to customers of all social application programs. As a result, operation steps of sending a message across application programs are complicated and inefficient.

The embodiments of this disclosure provide an information sending method and apparatus and an electronic device, the first input performed by the user on the target information in the target interface is received in the case that the target control is displayed; and the target information is sent to the target contact in response to the first input, where the target contact includes at least two contacts associated with the target control. According to this solution, because the target control displayed on the target interface in a floating manner is associated with contacts in some application programs, when the user wants to send the target information in the target interface to these contacts, the user may trigger sending of the target information to these contacts through the first input. In this way, the user does not need to consume a long time to frequently start multiple application programs and repeatedly copy and paste the target information. Therefore, the operation of sending a message across application programs is simple, the user may send a message more efficiently, and the time of the user can be saved.

The following describes the information sending method and apparatus and the electronic device provided in the embodiments of this disclosure in detail through some embodiments and application scenarios thereof with reference to the accompanying drawings.

As shown in FIG. 1, an embodiment of this disclosure provides an information sending method, including the following S101 and S102.

S101: an information sending apparatus receives, in a case that a target control is displayed, a first input performed by a user on target information in a target interface.

It should be noted that, in this embodiment of this disclosure, the target control is a control displayed in a floating manner, that is, a floating control, and there is one target control.

In addition, in the following embodiments, the target information is, for example, a message.

Optionally, the embodiments of this disclosure provide a function of sending a message across application programs. When the information sending apparatus enables the function of sending a message across application programs, a possible application scenario is: the information sending apparatus may directly display the target control on any interface in a floating manner, and then display the floating control on the target interface in a floating manner when displaying the target interface. Another possible application scenario is: the target interface is displayed in response to the input by the user and the target control is displayed on the target interface in a floating manner, that is, before the input by the user is received, the target control is not displayed on any interface. That is, the target control may be used to indicate that the function of sending a message across application programs is enabled. In this way, the user may determine, based on the target control displayed by the information sending apparatus, that the information sending apparatus has enabled the function of sending a message across application programs, and then execute the following S102.

Optionally, after the information sending apparatus enables the function of sending a message across application programs, the user may set, on a setting interface, multiple application programs, multiple groups, multiple contacts, or the like associated with the target control.

Figure 2A:
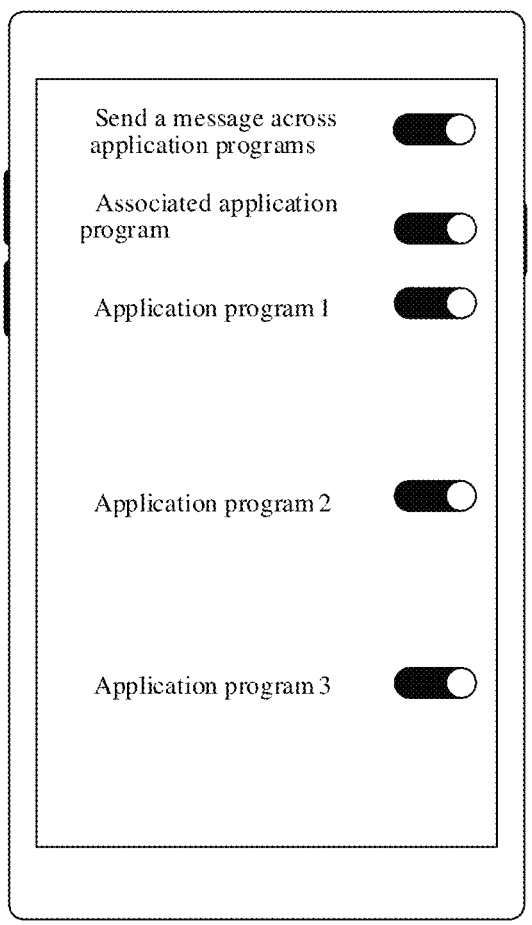
FIG. 2A is a first schematic diagram of an interface for setting information sending according to an embodiment of this disclosure.
Figure 2B:
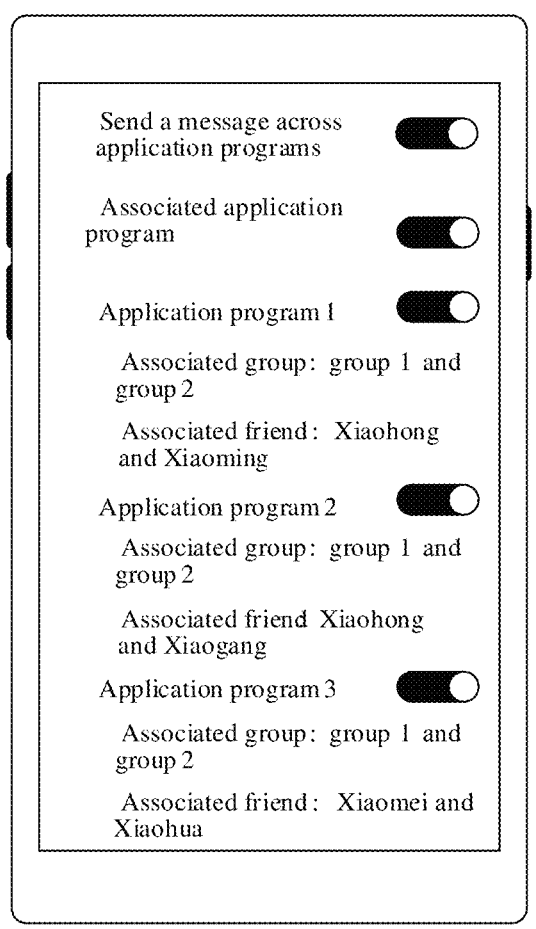
FIG. 2B is a second schematic diagram of an interface for setting information sending according to an embodiment of this disclosure.

Illustratively, as shown in FIG. 2A, the user triggers the information sending apparatus to enter the "setting" interface. First, the user may enable the function of "sending information across application programs". When the user triggers the information sending apparatus to start a button of the function, the information sending apparatus enables the function of sending information across application programs. Then, the user may start an application program associated with the target control: enable, by selecting buttons, the function of sending information across application programs. As shown in FIG. 2B, the user starts buttons of social application programs 1, 2, and 3, and the information sending apparatus makes intelligent recommendation according to recent activity degrees of friends or groups in the application programs 1, 2, and 3. The user may select groups corresponding to the application program 1: group 1 and group 2 and contacts: Xiaohong and Xiaoming; groups corresponding to the application program 2: the group 1 and the group 2 and contacts: Xiaohong and Xiaogang; and groups corresponding to the application program 3: the group 1 and the group 2 and contacts: Xiaomei and Xiaohua. In this way, the user may set the function of sending a message across application programs, and trigger the information sending apparatus to display the associated groups or contacts on the setting interface. It may be understood that if the user does not use a result recommended by the information sending apparatus, the information sending apparatus may jump to an address book interface, and the user may select associated groups or friends according to actual needs.

Optionally, the target interface is any interface with functions such as editing, copying, and pasting. The interface includes the following three possible cases: (1) the target interface is a desktop interface, for example, a desktop interface including an edit box; (2) the target interface is an interface of a system application program, such as an edit interface of an SMS application program, an edit interface of memo, or a video recording interface of a system camera; and (3) the target interface is an interface that includes an edit box and that is of a third-party application program, where the third-party application program may be a social application program or other application programs with editing, copying, and pasting functions, for example, a conversation chat interface of a chat tool.

Optionally, an application program of the target interface and an application program of the contact associated with the target control are different application programs. Alternatively, the application program of the target interface and the application program of the contact associated with the target control are a same application program, but the target interface and an interface of the target contact are different. Optionally, the application program of the target interface is one of multiple application programs of contacts associated with the target control. It may be determined according to actual situation, and this is not limited in the embodiments of this disclosure.

Optionally, content of the target information may include any one of following: a word, a picture, a short video, an address link, or the like.

Optionally, a type of the target information may be any one of following: a chat message, a dynamic message (for example, a dynamic message in a blog), a notification message, a push message, or the like.

Optionally, the first input may be a touch input, a voice input, or a gesture input performed by the user on the target information. For example, the touch input is an input of dragging the target information to the target control by the user. It may be understood that the first input may also be other possible inputs, which is not limited in this embodiment of this disclosure.

It may be understood that when the target control is one control, the user may send, through one input, the target information to contacts of multiple application programs associated with the control, that is, the user may directly and quickly send the target information to contacts of different application programs by performing only one operation. In this way, the energy of the user is saved, and a message is sent across application programs efficiently.

S102: the information sending apparatus sends the target information to the target contact in response to the first input.

The target contact includes at least two contacts associated with the target control.

Optionally, the first input is an input performed on the target information and the target control, and the at least two contacts associated with the target control are contacts of different application programs.

Illustratively, the at least two contacts associated with the target control may be contacts pre-selected by the user or active contacts obtained according to activity degrees of contacts.

Optionally, when the target contact includes at least two contacts associated with the target control, the target contact may be any one of following cases (1) to (3).

(1) The target contact may include at least a first contact of a first application and a second contact of a second application.

(2) The target contact includes at least a first individual and a first group.

Optionally, in one case, the first individual and the first group belong to different application programs; and in another case, the first individual and the first group belong to a same application program, but the first individual is not a contact in the first group.

(3) The target contact may include at least a first contact of a first application, a second contact of a second application, a first individual, and a first group.

Optionally, in one case, the first individual and the first group belong to different application programs, in another case, the first individual and the first group belong to a same application program, but the first individual is not a contact in the first group, and in still another case, the first individual and the first group belong to a same application program, and the first individual is a contact in the first group.

It may be understood that the user may set, according to actual needs, different contacts associated with the target control, so that the user may perform the input to trigger sending of the target information to the different contacts associated with the target control as expected.

Optionally, when the target contact includes a target group, the "sending the target information to the target contact" in the above S102 may include the following step (1) or step (2).

(1) The information sending apparatus sends the target information to the target group.

(2) The information sending apparatus sends the target information to each target individual corresponding to the target group, that is, each target individual is a contact in the target group.

It may be understood that if the user sets that the target control is associated with a target group, the target contact includes the target group. The application program of the target group and the application program of the target interface are different application programs. In this way, the user may perform the first input on the target interface to trigger the information sending apparatus to send the target information in the target interface to the target group, or send the target information to each contact in the target group once, that is, send a message across application programs.

Illustratively, for example, the type of the target information is a chat message. If the user wants to send a chat message to Xiaohong and Xiaoming in the application program 1, Xiaohong and Xiaogang in the application program 2, and Xiaomei and Xiaohua in the application program 3, as shown in FIG. 2A and FIG. 2B, the user may trigger the information sending apparatus to enable the function of sending a message across application programs, and set that the application program 1, the application program 2, and the application program 3 in the information sending apparatus are associated, and contacts associated with the application program 1 include Xiaohong and Xiaoming; contacts associated with the application program 2 include Xiaohong and Xiaogang; and contacts associated with the application program 3 include Xiaomei and Xiaohua. Then, the user edits a chat message in an edit box of a chat interface of social software, and drags the chat message to the control 1 when the control 1 associated with the application program 1, the application program 2, and the application program 3 is displayed on the chat interface (that is, the target interface) in a floating manner. After receiving the drag input (that is, the first input) performed by the user on the chat message and the control 1, the information sending apparatus sends the chat message to Xiaohong and Xiaoming in the application program 1, Xiaohong and Xiaogang in the application program 2, and Xiaomei and Xiaohua in the application program 3 (that is, the target contact) in response to the drag input.

Illustratively, for example, the type of the target information is a dynamic message. If the user wants to update dynamic messages on dynamic message interfaces in the application program 1, the application program 2, and the application program 3, as shown in FIG. 2A and FIG. 2B, the user may trigger the information sending apparatus to enable the function of sending a message across application programs, and set that the application program 1, the application program 2, and the application program 3 in the information sending apparatus are associated. Then, the user edits and records a video on a dynamic message interface of social software, and when a control 2 associated with the application program 1, the application program 2, and the application program 3 is displayed on the dynamic message interface (that is, the target interface) in a floating manner, drags the video to the control 2. After the information sending apparatus receives a drag input (that is, the first input) performed by the user on the video and the control 2, the information sending apparatus sends the video to the dynamic message interfaces in the application program 1, the application program 2, and the application program 3 in response to the drag input, that is, the information sending apparatus updates messages on the dynamic message interfaces in the application program 1, the application program 2, and the application program 3.

It may be understood that when the target information is a dynamic message, if the user only sets multiple associated application programs on the setting interface, all contacts in the associated application programs have the permission to view the target information after the information sending apparatus sends the target information. If the user sets multiple associated application programs and some contacts associated with each application program on the setting interface, only some contacts in the multiple associated application programs have the permission to view the target information after the sender sends the target information. In this way, the sender may selectively provide the reading permission of the target information.

This embodiment of this disclosure provides an information sending method. Because the target control displayed on the target interface in a floating manner is associated with contacts in some application programs, when the user wants to send the target information in the target interface to these contacts, the user may trigger sending of the target information to these contacts through the first input. In this way, the user does not need to consume a long time to frequently start multiple application programs and repeatedly copy and paste the target information. Therefore, the operation of sending a message across application programs is simple, the user may send a message more efficiently, and the time of the user can be saved.

Optionally, during display of multiple display controls including the target control, S101 may be implemented by the following S101A, and correspondingly, S102 may be implemented by the following S102A.

S101A: receive, in a case that at least three display controls are displayed, a first input performed by the user on a first control, a target control, and the target information in the target interface.

The first control and the target control are display controls of the at least three display controls.

Optionally, the first input may include a first sub-input and a second sub-input. The first sub-input is an input performed by the user on the first control and the target information in the target interface, and the second sub-input is an input performed by the user on the target control and the target information in the target interface. Illustratively, the first sub-input is an operation of dragging the target information in the target interface to the first control, and the second sub-input is an operation of dragging the target information in the target interface to the target control.

Optionally, for example, the first input is an input performed by the user on two of the at least three display controls and the target information, or the first input may be an input performed by the user on multiple controls of the at least three display controls and the target information. Refer to the description of the first control, the target control, and the target information in the target interface in the above embodiment, which is not repeated herein.

Optionally, when the at least three display controls are displayed, if the first input is a preset input performed on the target information, the target information is shared with multiple contacts associated with all of the at least three display controls, that is, the preset input is associated with the at least three display controls.

Illustratively, when the first input is a preset input performed on the target information, the first input may be a double-click input performed by the user on the target information, or an input of dragging the target information to a preset area.

S102A: send the target information to the target contact and a first contact in response to the first input.

The first contact is a contact associated with the first control.

Optionally, the first control may be associated with multiple contacts, and the multiple contacts include the first contact.

It may be understood that when multiple controls are displayed, the user may perform the first input to send the target information to contacts in different application programs associated with some of the multiple controls, or to contacts in different application programs associated with all the controls as required, that is, the user may selectively input multiple controls to quickly send the target information to contacts of different application programs. In this way, the energy of the user is saved, and a message is sent across application programs efficiently.

Figure 3:
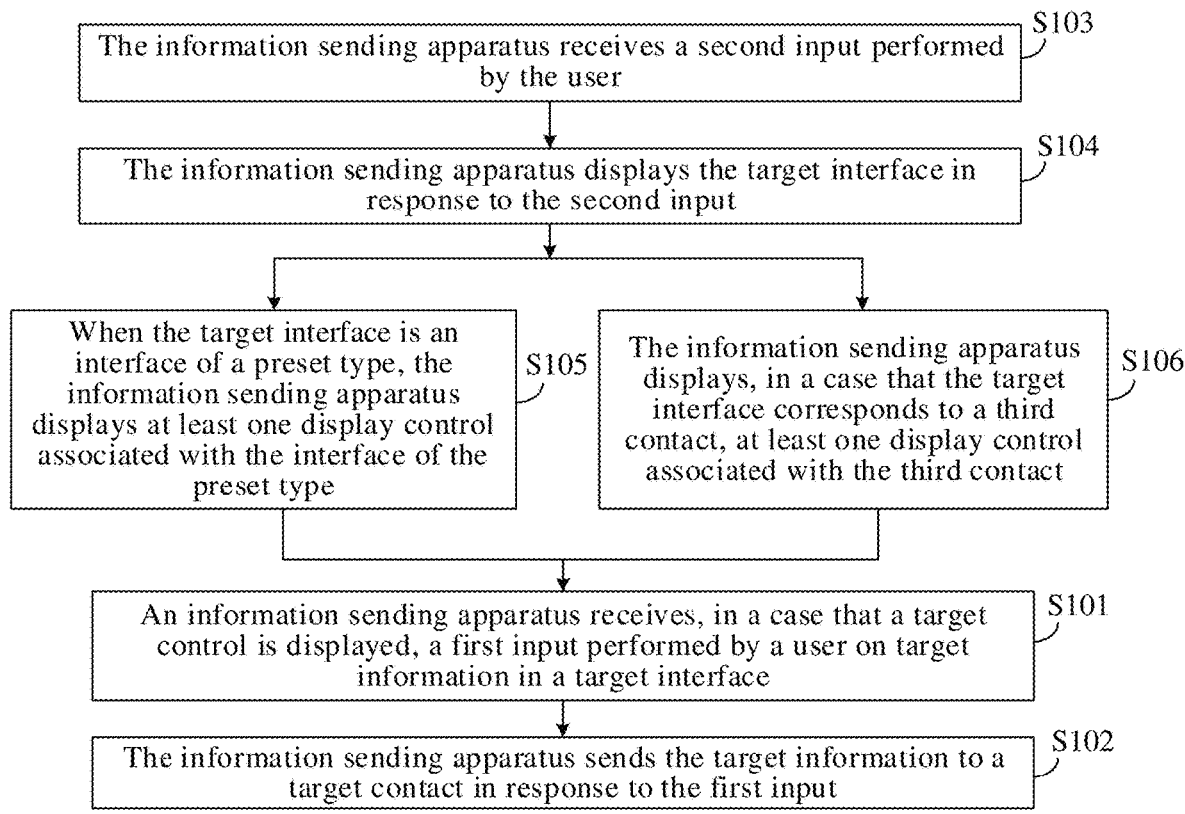
FIG. 3 is a second schematic diagram of an information sending method according to an embodiment of this disclosure.

Optionally, with reference to FIG. 1, as shown in FIG. 3, before the foregoing S101, the information sending method provided in this embodiment of this disclosure program may further include the following S103, S104, and S105, or the following S103, S104, and S106.

S103: the information sending apparatus receives a second input performed by the user.

Optionally, the second input may be a touch input, a voice input, or a gesture input performed by the user on an icon of a target application program or a target interface, the icon of the target application program may be an icon of a social application program or an icon of other application programs with a message editing function, and the target interface may be a desktop interface. For example, the touch input is a click input performed by the user on the social application program or a sliding input performed on the desktop interface. It may be understood that the second input may also be other possible inputs, which is not limited in this embodiment of this disclosure.

S104: the information sending apparatus displays the target interface in response to the second input.

S105: when the target interface is an interface of a preset type, the information sending apparatus displays at least one display control associated with the interface of the preset type.

The target control is one of the at least one display control.

Optionally, the preset type may include any one of following: a text type, a video type, a picture type, or the like.

Illustratively, the user has triggered the information sending apparatus to enable the function of sending a message across application programs. The user may click on an icon of a short video application program in the information sending apparatus, and after receiving the click input (that is, the second input) performed on the icon of the short video application program by the user, the information sending apparatus displays a video recording interface (that is, the target interface) in response to the click input. Since the video recording interface belongs to the video type, the information sending apparatus displays, in a floating manner on the video recording interface, a control 3 (that is, the target control) associated with the interface of the video type.

S106: the information sending apparatus displays, in a case that the target interface corresponds to a third contact, at least one display control associated with the third contact.

The target control is one of the at least one display control.

Optionally, in one case, the target interface is a chat interface of the third contact, and in another case, the target interface is a chat interface of a group and the third contact is in the group.

Illustratively, it is assumed that Xiaoming and Xiaohong are friends in an application program 4 associated with a control 4, and Xiaoming and Xiaogang are friends in an application program 5 associated with a control 5. If the user wants to send the target information to Xiaohong in the application program 4 and Xiaogang in the application program 5, the user may click on the contact Xiaoming. After receiving the click input (that is, the second input) performed on the contact Xiaoming, the information sending apparatus displays a chat interface (that is, the target interface) of Xiaoming in response to the click input. Because Xiaoming is associated with both the control 4 and the control 5, the information sending apparatus displays the control 4 and the control 5 in a floating manner on the chat interface.

Optionally, after S104, the information sending method provided in this embodiment of this disclosure may further include the following S107.

S107: the information sending apparatus inputs the target information in the target interface in response to an input performed by the user on the target interface.

It should be noted that, in this embodiment of this disclosure, after S104, S107 may be executed before S105 or S107 may be executed after S105, and S107 may be executed before S106 or S106 may be executed before S107. This is determined by the information sending apparatus according to an actual case, which is not limited in this embodiment of this disclosure.

In the information sending method provided in this embodiment of this disclosure, on the one hand, the information sending apparatus may selectively display, on the target interface according to the type of the target interface, at least one control associated with the type of the target interface. In this way, when the information sending apparatus is provided with multiple controls, the information sending apparatus may select a required control from the multiple controls in a targeted manner and display the required control on the target interface. On the other hand, the information sending apparatus may display, on the target interface according to the contact included on the target interface, all controls associated with the contact. In this way, it is convenient for the user to visually view all controls associated with the contact, and then the user may select a required control according to actual needs, thus improving the efficiency of message sending.

It should be noted that the information sending method provided in the embodiments of this disclosure may be performed by an information sending apparatus or a control module included in the information sending apparatus and configured to perform the information sending method. In an embodiment of this application, for example, the information sending method provided in the embodiments of this application is described by using an example in which the information sending method is performed by an information sending apparatus.

Figure 4:
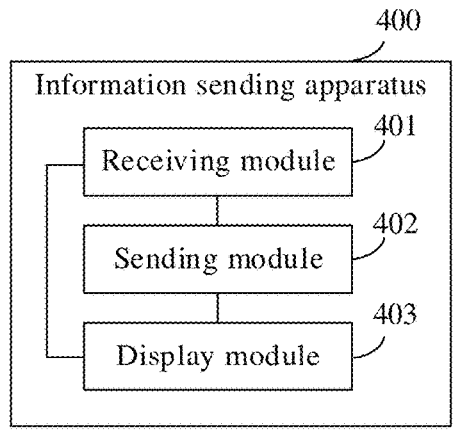
FIG. 4 is a schematic structural diagram of an information sending apparatus according to an embodiment of this disclosure.

As shown in FIG. 4, an embodiment of this disclosure provides an information sending apparatus 400. The information sending apparatus may include a receiving module 401 and a sending module 402. The receiving module 401 may be configured to receive, in a case that a target control is displayed, a first input performed by a user on target information in a target interface. The sending module 402 may be configured to send the target information to a target contact in response to the first input received by the receiving module 401, where the target contact includes at least two contacts associated with the target control.

Optionally, the receiving module 401 may be configured to receive, in a case that at least three display controls are displayed, a first input performed by the user on a first control, a target control, and the target information in the target interface. The first control and the target control are display control of the at least three display controls. The sending module 402 may be configured to send the target information to the target contact and a first contact in response to the first input received by the receiving module 401, where the first contact is a contact associated with the first control.

Optionally, the target contact includes at least a first contact in a first application and a second contact in a second application, and/or the target contact includes at least a first individual and a first group.

Optionally, the information sending apparatus further includes a display module 403. The receiving module 401 may be further configured to receive a second input performed by the user. The display module 403 may be configured to display the target interface in response to the second input received by the receiving module 401. The display module 403 may be further configured to display, in a case that the target interface is an interface of a preset type, at least one display control associated with the interface of the preset type, where the target control is one of the at least one display control; or display, in a case that the target interface corresponds to a third contact, at least one display control associated with the third contact, where the target control is one of the at least one display control.

Optionally, the target contact includes a target group. The sending module 402 may be configured to send the target information to the target group, or send the target information to each target individual corresponding to the target group.

The information sending apparatus in this embodiment of this disclosure may be an apparatus, or a component, an integrated circuit, or a chip in a terminal. The apparatus may be a mobile electronic device or a non-mobile electronic device. For example, the mobile electronic device may be a mobile phone, a tablet computer, a laptop computer, a palmtop computer, an in-vehicle electronic device, a wearable device, an ultra-mobile personal computer (UMPC), a netbook, or a personal digital assistant (PDA). The non-mobile electronic device may be a server, a network attached storage (NAS), a personal computer (PC), a television (TV), an automated teller machine, or a self-service machine. This is not specifically limited in the embodiments of this disclosure.

The information sending apparatus in this embodiment of this disclosure may be an apparatus with an operating system. The operating system may be an Android operating system, or may be an ios operating system or other possible operating systems, which is not specifically limited in the embodiments of this disclosure.

The information sending apparatus provided in this embodiment of this disclosure may implement the processes implemented by the information processing apparatus in the method embodiments of FIG. 1 to FIG. 3. To avoid repetition, details are not described herein again.

This embodiment of this disclosure provides an information sending apparatus. Because the target control displayed on the target interface in a floating manner is associated with contacts in some application programs, when the user wants to send the target information in the target interface to these contacts, the user may trigger the information sending apparatus to send the target information to these contacts through the first input. In this way, the user does not need to consume a long time to frequently start multiple application programs and repeatedly copy and paste the target information. Therefore, the operation of sending a message across application programs is simple, the user may send a message more efficiently, and the time of the user may be saved.

Figure 5:
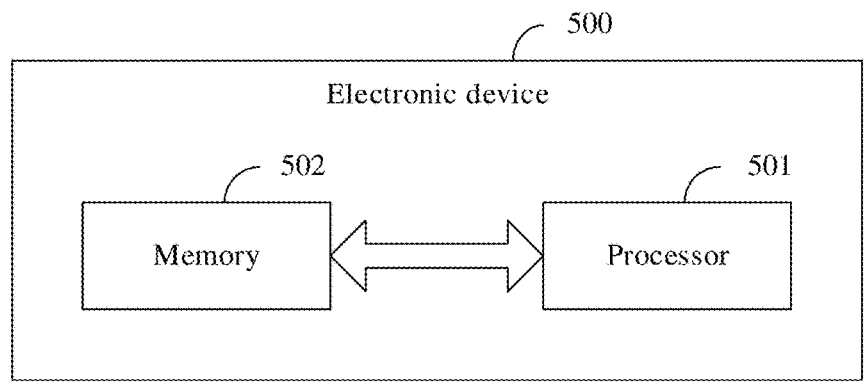
FIG. 5 is a schematic structural diagram of an electronic device according to an embodiment of the present disclosure.

Optionally, the embodiments of this disclosure further provide an electronic device 500, including a processor 501, a memory 502, and programs or instructions stored in the memory 502 and executable on the processor 501, as shown in FIG. 5. When the programs or instructions are executed by the processor 501, the processes of the foregoing embodiment of the information sending method are implemented, and a same technical effect can be achieved. To avoid repetition, details are not described herein again.

It should be noted that the electronic device in this embodiment of this disclosure includes the above mobile electronic device and non-mobile electronic device.

Figure 6:
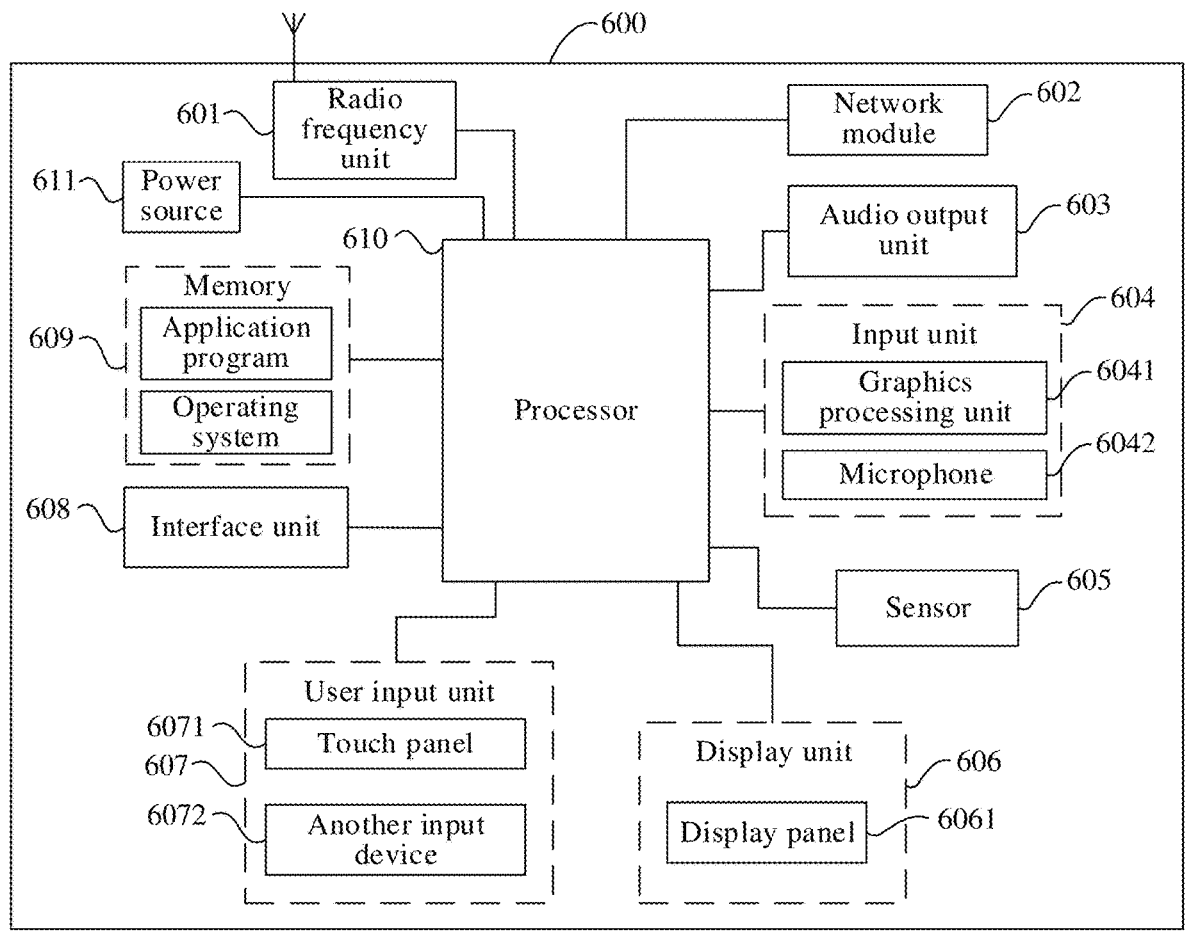
FIG. 6 is a schematic diagram of hardware of an electronic device according to an embodiment of this disclosure.

FIG. 6 is a schematic diagram of a hardware structure of an electronic device according to an embodiment of this disclosure.

The electronic device 600 includes, but is not limited to, components such as a radio frequency unit 601, a network module 602, an audio output unit 603, an input unit 604, a sensor 605, a display unit 606, a user input unit 607, an interface unit 608, a memory 609, and a processor 610.

Those skilled in the art may understand that the electronic device 600 may further include a power supply 611 (such as a battery) for supplying power to the components. The power supply 611 may logically connect to the processor 610 by using a power supply management system, thereby implementing functions such as charging, discharging, and power consumption management, by using the power supply management system. The structure of the electronic device shown in FIG. 6 constitutes no limitation on the electronic device, and the electronic device may include more or fewer components than those shown in the figure, or some components may be combined, or a different component deployment may be used. Details are not repeated herein.

The user input unit 607 may be configured to receive, in a case that a target control is displayed, a first input performed by a user on target information in a target interface. The display unit 606 may be configured to send the target information to a target contact in response to the first input received by the user input unit 607, where the target contact includes at least two contacts associated with the target control.

Optionally, the user input unit 607 is configured to receive, in a case that at least three display controls are displayed, a first input performed by the user on a first control, a target control, and the target information in the target interface, where the first control and the target control are display controls of the at least three display controls. The display unit 606 may be configured to send the target information to the target contact and a first contact in response to the first input received by the user input unit 607, where the first contact is a contact associated with the first control.

Optionally, the user input unit 607 is further configured to receive a second input performed by the user. The display unit 606 may be configured to display the target interface in response to the second input received by the user input unit 607. The display unit 606 is further configured to display, in a case that the target interface is an interface of a preset type, at least one display control associated with the interface of the preset type, where the target control is one of the at least one display control; or display, in a case that the target interface corresponds to a third contact, at least one display control associated with the third contact, where the target control is one of the at least one display control.

This embodiment of this disclosure provides an electronic device. Because the target control displayed on the target interface in a floating manner is associated with contacts in some application programs, when the user wants to send the target information in the target interface to these contacts, the user may trigger the electronic device to send the target information to these contacts through the first input. In this way, the user does not need to consume a long time to frequently start multiple application programs and repeatedly copy and paste the target information. Therefore, the operation of sending a message across application programs is simple, the user may send a message more efficiently, and the time of the user can be saved.

It should be understood that in this embodiment of this disclosure, the input unit 604 may include a graphics processing unit (GPU) 6041 and a microphone 6042, and the graphics processing unit 6041 processes image data of a still picture or a video obtained by an image capture apparatus (such as a camera) in a video capture mode or an image capture mode. The display unit 606 may include a display panel 6061, and the display panel 6061 may be configured in the form of a liquid crystal display, an organic light-emitting diode, and the like. The user input unit 607 includes a touch panel 6071 and another input device 6072. The touch panel 6071 is also called a touch screen. The touch panel 6071 may include two parts: a touch detection apparatus and a touch controller. Another input device 6072 may include but is not limited to: a physical keyboard, a function key (such as a volume control key or a switch key), a trackball, a mouse, and a joystick, which is no longer repeated herein. The memory 609 may be configured to store software programs and various data, including but not limited to application programs and operating systems. The processor 610 may integrate an application processor and a modem processor. The application processor mainly processes an operating system, a user interface, an application, and the like. The modem processor mainly processes wireless communication. It may be understood that the modem processor may alternatively not be integrated into the processor 610.

The embodiments of this disclosure further provide a non-transitory readable storage medium storing therein a program or an instruction. The program or instruction is executed by a processor to implement the processes of the embodiments of the foregoing information sending method, and the same technical effects can be achieved, which will not be described in detail herein again to avoid repetition.

The processor is a processor in the electronic device in the foregoing embodiments. The non-transitory readable storage medium includes a non-transitory computer-readable storage medium, for example, a computer read-only memory (ROM), a random access memory (RAM), a magnetic disk, or an optical disc.

The embodiments of this disclosure further provide a chip. The chip includes a processor and a communication interface. The communication interface is coupled to the processor for running a program or an instruction to implement the processes of the embodiments of the foregoing information sending method, and the same technical effects can be achieved, which will not be described in detail herein again to avoid repetition.

It should be noted that, the chip mentioned in the embodiments of this disclosure may also be referred to as a system-level chip, a system chip, a chip system, a system on chip, or the like.

It should be noted that the term "comprise", "include" or any other variation thereof in this specification is intended to cover a non-exclusive inclusion, which specifies the presence of stated processes, methods, objects, or apparatuses, but does not preclude the presence or addition of one or more other processes, methods, objects, or apparatuses.

Without more limitations, elements defined by a sentence "including one" does not exclude that there are still other same elements in the process, method, object, or apparatus. Furthermore, it should be noted that a scope of the methods and apparatus in the embodiments of this disclosure is not limited to performing the functions in the order shown or discussed, but may also include performing the functions in a substantially simultaneous manner or in the reverse order depending on the functions involved. For example, the methods described may be performed in an order different from that described, and various steps may also be added, omitted, or combined. In addition, features described with reference to some examples may be combined in other examples.

Through the descriptions of the foregoing implementations, a person skilled in the art may clearly understand that the method according to the foregoing embodiments may be implemented through software and a necessary general hardware platform, and certainly, may also be implemented by hardware, but in many cases, the former manner is a better implementation. Based on such an understanding, the technical solutions of this disclosure essentially, or the part contributing to the prior art may be implemented in a form of a software product. The computer software product is stored in a non-transitory storage medium (for example, a ROM/RAM, a magnetic disk, or an optical disc), and includes several instructions for instructing a terminal (which may be a mobile phone, a computer, a server, an air conditioner, a network device, or the like) to perform the methods according to the embodiments of this disclosure.

Although the embodiments of this disclosure have been described above with reference to the accompanying drawings, this disclosure is not limited to the specific embodiments described above, and the specific embodiments described above are merely exemplary and not limitative. A person of ordinary skill in the art may make various variations under the teaching of this disclosure without departing from the spirit of this disclosure and the protection scope of the claims, and such variations shall all fall within the protection scope of this disclosure.

What is claimed is:

1. An information sending method, comprising:
    receiving a first input performed by a user;
    displaying a target interface in response to the first input;
    displaying, in a case that the target interface is an interface of a preset type, at least one display control associated with the interface of the preset type, wherein different preset types correspond to different display controls, a target control is one of the at least one display control, and the preset type comprises any one of: a video type and a picture type;
    receiving, in a case that at least three display controls are displayed, a second input performed by the user on a first control, the target control, and target information in the target interface, wherein the second input comprises a first sub-input and a second sub-input, the first sub-input being an input performed by the user on the first control and the target information, the second sub-input being an input performed by the user on the target control and the target information, and the first control and the target control being display controls of the at least three display controls; and
    sending the target information to a target contact and a first contact in response to the second input;
    wherein the target contact comprises at least two contacts associated with the target control, the at least two contacts associated with the target control are contacts of different application programs, the first contact is a contact associated with the first control, and the target control is a floating control.

2. The method according to claim 1, wherein the target contact comprises a target group, and the sending the target information to the target contact specifically comprises:
    sending the target information to the target group, or sending the target information to each target individual corresponding to the target group.

3. An electronic device, comprising a processor, a memory, and programs or instructions stored in the memory and executable on the processor, wherein the programs or instructions, when executed by the processor, cause the electronic device to perform:
    receiving a first input performed by a user;
    displaying a target interface in response to the first input;
    displaying, in a case that the target interface is an interface of a preset type, at least one display control associated with the interface of the preset type, wherein different preset types correspond to different display controls, a target control is one of the at least one display control, and the preset type comprises any one of: a video type and a picture type;
    receiving, in a case that at least three display controls are displayed, a second input performed by the user on a first control, the target control, and target information in the target interface, wherein the second input comprises a first sub-input and a second sub-input; the first sub-input is an input performed by the user on the first control and the target information, and the second sub-input is an input performed by the user on the target control and the target information; and the first control and the target control are display controls of the at least three display controls; and
    sending the target information to a target contact and a first contact in response to the second input;
    wherein the target contact comprises at least two contacts associated with the target control, the at least two contacts associated with the target control are contacts of different application programs, the first contact is a contact associated with the first control, and the target control is a floating control.

4. The electronic device according to claim 3, wherein the target contact comprises a target group, and the programs or the instructions, when executed by the processor, further cause the electronic device to perform:
    sending the target information to the target group, or sending the target information to each target individual corresponding to the target group.

5. A non-transitory readable storage medium, wherein the non-transitory readable storage medium stores programs or instructions, and the programs or the instructions, when executed by a processor of an electronic device, cause the electronic device to perform:
    receiving a first input performed by a user;
    displaying a target interface in response to the first input;
    displaying, in a case that the target interface is an interface of a preset type, at least one display control associated with the interface of the preset type, wherein different preset types correspond to different display controls, a target control is one of the at least one display control, and the preset type comprises any one of: a video type and a picture type;
    receiving, in a case that at least three display controls are displayed, a second input performed by the user on a first control, the target control, and target information in the target interface, wherein the second input comprises a first sub-input and a second sub-input; the first sub-input is an input performed by the user on the first control and the target information, and the second sub-input is an input performed by the user on the target control and the target information; and the first control and the target control are display controls of the at least three display controls; and sending the target information to a target contact and a first contact in response to the second input;

wherein the target contact comprises at least two contacts associated with the target control, the at least two contacts associated with the target control are contacts of different application programs, the first contact is a contact associated with the first control, the target control is a floating control.

6. The non-transitory readable storage medium according to claim 5, wherein the target contact comprises a target group, and the programs or the instructions, when executed by the processor, further cause the electronic device to perform:

sending the target information to the target group, or sending the target information to each target individual corresponding to the target group.

7. A computer software product, wherein the computer software product is executed by at least one processor to implement the method according to claim 1.

8. A chip, comprising a processor and a communication interface, wherein the communication interface is coupled to the processor, and the processor is configured to execute programs or instructions to implement the method according to claim 1.

9. A computer software product, wherein the computer software product is executed by at least one processor to implement the method according to claim 2.

10. A chip, comprising a processor and a communication interface, wherein the communication interface is coupled to the processor, and the processor is configured to execute programs or instructions to implement the method according to claim 2.

* * * * *